(12) United States Patent
Pirnazar

(10) Patent No.: US 10,079,796 B2
(45) Date of Patent: Sep. 18, 2018

(54) METHOD AND SYSTEM FOR SECURE PRIVATE MULTI-PARTY ELECTRONIC COMMUNICATION

(71) Applicant: Vaultcast, Inc., Los Angeles, CA (US)

(72) Inventor: Payman Pirnazar, Los Angeles, CA (US)

(73) Assignee: VAULTCAST, INC., Los Angeles, CA (US)

( * ) Notice: Subject to any disclaimer, the term of this patent is extended or adjusted under 35 U.S.C. 154(b) by 228 days.

(21) Appl. No.: 15/017,090

(22) Filed: Feb. 5, 2016

(65) Prior Publication Data
US 2017/0230325 A1    Aug. 10, 2017

(51) Int. Cl.
*H04L 12/58* (2006.01)
*H04L 29/06* (2006.01)
*H04W 4/06* (2009.01)

(52) U.S. Cl.
CPC .............. *H04L 51/36* (2013.01); *H04L 51/32* (2013.01); *H04L 65/1069* (2013.01); *H04L 65/403* (2013.01); *H04W 4/06* (2013.01)

(58) Field of Classification Search
CPC ..... H04L 51/32; H04L 51/36; H04L 65/1069; H04L 65/403; H04W 4/06
USPC ........................................................ 709/206
See application file for complete search history.

(56) References Cited

U.S. PATENT DOCUMENTS

| | | | |
|---|---|---|---|
| 5,283,856 A | 2/1994 | Gross | |
| 6,134,582 A * | 10/2000 | Kennedy | G06Q 10/107 709/203 |
| 6,757,713 B1 | 6/2004 | Ogilvie | |
| 7,590,696 B1 * | 9/2009 | Odell | G06Q 10/107 455/466 |
| 7,653,693 B2 | 1/2010 | Heikes | |
| 8,751,594 B2 | 6/2014 | Aceves | |
| 2004/0199586 A1 * | 10/2004 | Kaler | H04L 29/06 709/206 |
| 2004/0268142 A1 | 12/2004 | Karjala et al. | |
| 2008/0016575 A1 | 1/2008 | Vincent | |

(Continued)

FOREIGN PATENT DOCUMENTS

GB          2511259         8/2014

OTHER PUBLICATIONS

Li Lian, "GeoChat on iPhone: A Map-baged Chat Appiication on iPhone," Uppsala University, Sep. 2010.

(Continued)

*Primary Examiner* — Alina A Boutah
(74) *Attorney, Agent, or Firm* — Convergent Law Group LLP

(57) ABSTRACT

A method and system for securing electronic communication between users is described. The users utilize a plurality of computing devices. Message(s) from other computing devices are received on a computing device of a user. Each message has a time indicator and a session indicator. A response to a message of the message(s) is provided. The response includes sending a response message from the computing device and/or receiving a selection of a clear function from the user. In response to the response, the message being responded to and a portion of the message(s) are removed. Each of the portion of the message(s) being removed has the session indicator and an earlier time indicator than the time indicator for the message being responded to.

17 Claims, 7 Drawing Sheets

(56) References Cited

U.S. PATENT DOCUMENTS

| | | | | |
|---|---|---|---|---|
| 2009/0327247 | A1* | 12/2009 | Jia | H04L 51/04 |
| 2009/0328060 | A1* | 12/2009 | Bhumana | G06F 9/546 |
| | | | | 719/313 |
| 2010/0299376 | A1 | 11/2010 | Batchu et al. | |
| 2013/0117392 | A1* | 5/2013 | Aceves | H04L 51/30 |
| | | | | 709/206 |
| 2013/0172026 | A1* | 7/2013 | Odell | H04L 51/046 |
| | | | | 455/466 |
| 2015/0133082 | A1 | 5/2015 | Broch et al. | |
| 2016/0277327 | A1* | 9/2016 | Zha | G06Q 10/107 |

OTHER PUBLICATIONS

Sameer Patil, Alfred Kobsa, "Enhancing Privacy Management Support in Instant Messaging," Interacting with Computers, Oct. 20, 2009.

* cited by examiner

METHOD AND SYSTEM FOR SECURE PRIVATE MULTI-PARTY ELECTRONIC COMMUNICATION

BACKGROUND

Electronic communication for example via text messaging, chat sessions, email and the like, has become ubiquitous. Individuals exchange messages, which are stored both on a server through which communication takes place and on the computing devices of the users. For example, an individual may send a text message to multiple members of a group. The text message is stored on the computing devices, such as smart phones, of the users in the group. In some cases, the text message may also be stored in cloud storage associated with the users' devices. The text message also appears on the display of the smart phone. The recipients may read the text at their leisure then reply to the text message when desired. As a result, members of the group may conduct an electronic conversation with multiple other members. This electronic conversation may last an indeterminate amount of time—for example from a few minutes to a few days, depending upon the speed with which the members reply and how much members of the group have to say to each other.

Although conventional electronic communication is useful, mechanisms for secure communication are desired. Current electronic communication allows for individual messages to expire after a predetermined time. Thus, the message is automatically deleted after the predetermined time expires. This time is typically quite short—on the order of tens of minutes or less. Consequently, the message may be deleted before a recipient has the opportunity to review the message or may persist after the recipient has read the message. Alternatively, the message may be encrypted. However, in such cases, the message requires decryption before it may be read by each recipient user. In addition, such a message may persist in memory of the computing device unless the user deletes the message or the message has a specified expiration date.

Accordingly, a mechanism for providing secure, non-persistent electronic communication is desired.

BRIEF SUMMARY

Exemplary embodiments include a method and system for securing electronic communication between users. The users utilize a plurality of computing devices. Message(s) from other computing devices are received on a computing device of a user. Each message has a time indicator and a session indicator. A response to one of the message(s) is provided. The response includes sending a response message from the computing device and/or a receiving a selection of a clear function from the user. In response to the response message being provided, the message being responded to and a portion of the plurality of the messages are removed. Each of the messages that are removed has an earlier time indicator than the time indicator for the message being responded to and has the session indicator.

DETAILED DESCRIPTION

Figure 1A:
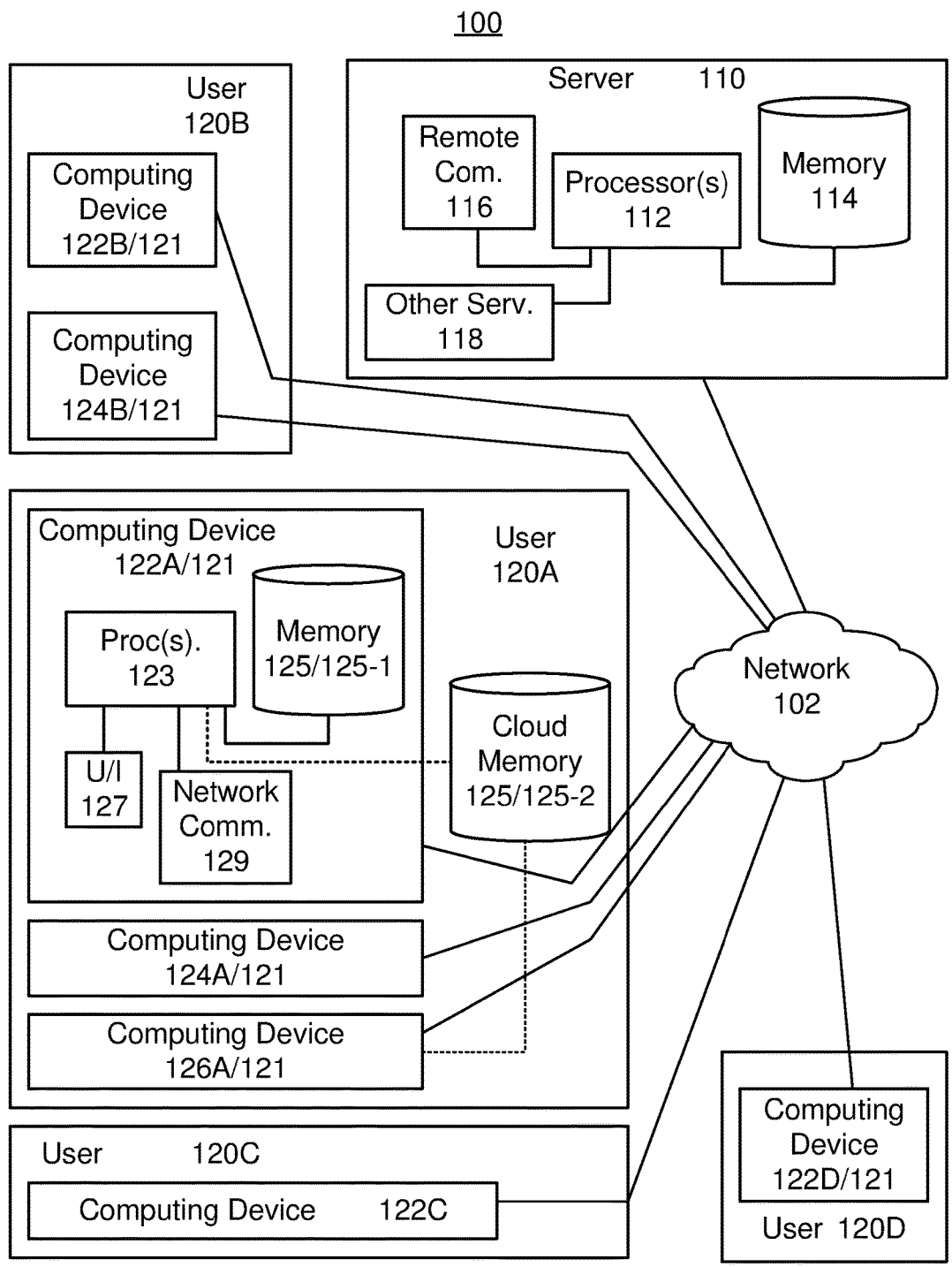
FIG. 1A is a block diagram of an exemplary embodiment of a system for providing secure electronic communication.

The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, the systems and/or devices may include more or less components than those shown, and variations in the arrangement and type of the components may be made without departing from the scope of the invention. Further, although specific blocks are depicted, various functions of the blocks may be separated into different blocks or combined. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein. Reference is made in detail to the embodiments, examples of which are illustrated in the accompanying drawings, wherein like reference numerals refer to the like elements throughout. Further, aspects of the method and system may take the form of an entirely hardware embodiment, an entirely software embodiment (including firmware, resident software, micro-code, etc.) or an embodiment combining software and hardware aspects. Furthermore, aspects of the method and system may take the form of a software component(s) executed on at least one processor and which may be embodied in one or more computer readable medium(s) having computer readable program code embodied thereon. User operations, such as selection of various functions are also described. One of ordinary skill in the art will recognize that this may be accomplished in a number of ways including but not limited to tapping a region of a touch screen, selection using a cursor, selection using a particular gesture, or by some other mechanism.

The use of the terms "a" and "an" and "the" and similar referents in the context of describing the exemplary embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified.

Exemplary embodiments include a method and system for securing electronic communication between users. The users utilize a plurality of computing devices. Messages from other computing devices are received on a computing device of a user. Each message has a time indicator and a session indicator. A response to one of the messages is provided. The response includes sending a response message from the computing device and/or a receiving a selection of a clear function from the user. In response to the response message being provided, the message being responded to and a portion of the plurality of the messages are removed. Each of the messages that are removed has an earlier time indicator than the time indicator for the message being responded to and has the session indicator.

Figure 1B:
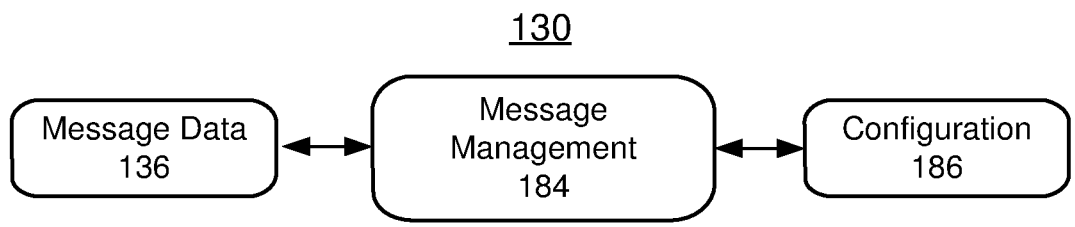
FIG. 1B is a functional block diagram of an exemplary embodiment of a system for providing secure electronic communication.

FIG. 1A is a block diagram illustrating an exemplary embodiment of a secure multi-party electronic communication system 100. FIG. 1B is a functional block diagram of an exemplary embodiment of a system 130 for providing secure electronic communication. The system 130 may take the form of software implemented by one or more portions of the system 100. The communication system 100 may include a server 110 and computing devices of the users 120A, 120B, 120C and 130. Communication takes place via a network 102. The network 102 may include the Internet, cellular network, a cable network, a telephonic (land line) network, a satellite network, another mechanism and/or some combination thereof through which the computing devices for the users 102A, 120B, 120C and 120D and the server 110 may communicate. The server 110 includes processor(s) 112, memory/data store 114, remote communication component 116 and other services component 118. In some embodiments, the server 110 may be bypassed or simply used to ensure that electronic communications are routed to and from the appropriate computing devices of the users 120A, 120B, 120C and 120D. For example, the computing devices 121 may communicate directly through a cellular network. In other embodiments, the server 110 takes a more active role in ensuring that electronic communications are secure, as discussed below.

Each of the users 120A, 120B, 120C and 120D utilizes one or more computing devices (collectively references as computing devices 121). The computing devices 121 may include but are not limited to smartphones, tablets, laptops, desktops, set top boxes and/or other analogous device. The user 120A has three computing devices 122A, 124A and 126A. The user 120B has two computing devices 122B and 124B. The user 120C has one computing device 122C. The user 120D has computing device 120D. The number of computing devices 121 for each user 120A, 120B, 120C and 120D and the number of users are for explanatory purposes only and are not intended to be limiting. Further, although shown with separate connections to the network 102, the computing devices 121 for each user 120A, 120B, 120C and 12D may connect to the network 102 via a single router at least some of the time. Each user does, however, have at least one computing device. In the embodiment shown, the users 120A, 120B and 120C are communicating securely. The user 120D may communicate with one or more of the users 120A, 120B and 120C, but is not part of the secure communication. Thus, the system 100 may handle both secure and nonsecure communication. In other embodiments, only secure communications are supported.

Because each of the computing devices 121 includes some or all of components that are analogous, the computing devices 121 are depicted and described in the context of computing device 122A. The computing device 122A is shown as including at least one processor 123, memory 125, a user interface 127 and a network communication device 129. The memory 125 may include device memory 125-1 and cloud memory 125-2. The device memory 125-1 may include semiconductor memory, magnetic memory and/or another local memory. The cloud memory 125-2 may be connected to the computing device 122A through the network 102 or another mechanism. The cloud memory 125-2 may reside on the user's a local data store or other memory that the computing device 122A can access. In other embodiments, the cloud memory 125-2 may be omitted for one or more of the computing devices. The processor(s) 123 may be used to execute one or more software components (not shown in FIG. 1A) that are used to perform secure communication separately or in conjunction with the server 110. These software components may be stored in whole or in part in the memory 125-1 and/or 125-2. The user interface 125 may include a display (touch or otherwise), a keypad, microphone, speaker and/or other mechanism through which the user 120A can receive output from and provide input to the computing device 122. The network communication device 129 allows the computing device 122 to communicate with the network 102. This communication may occur through a router (not shown), a wireless (e.g. cellular) connection or via another manner.

FIG. 1B depicts an exemplary embodiment of the functional system 130 that may be used by the system 100 to provide secure communication. Thus, the functional system 130 may be formed of software components executed by the processor(s) 123 and/or 112. Although particular functional blocks are shown, the blocks could have another arrangement, share functions in a different manner and/or be connected in another manner. For example, the functions of each of the blocks 132, 134 and/or 136 may be combined into fewer blocks, including a single block or separated into more blocks.

The system 130 includes a message management block 132, a configuration block 134 and a message data block 136 used in sending and receiving secure electronic communications (messages). As used herein, a message is any form of electronic communication that may be handled securely using the systems and methods described in the present application. The messages include but are not limited to text messages, communications for chat session, email messages, social media posts, blog comment, and/or other electronic communications that may persist on a computing device or server system. The message data block 136 allows for input of the actual data to be sent in the message. For example, the message data block 136 may allow for input of text, voice, video and/or images. The configuration block 134 receives the selections made by the users or other managers and provides output to the user, for example by controlling a display that is part of the user interface 127. The configuration block 134 thus allows the user to interact with the system 100 for the purposes of formatting secure communications, for example via a control panel. The configuration block 134 may allow for the selection and management of messages or groups for secure communication in accordance with the exemplary embodiments. The configuration block 134 may allow the user/administrator to select, via user interface 127, the users 120A, 120B and 120C that are to be part of the secure communication session, a particular start message for secure communication, a time or other condition which terminates the secure communication session, or otherwise control the secure communication session. The configuration block 134 may also control storage and updating of the information related to the session in the memory 125 and/or 114.

The configuration block 134 may also allow the user/administrator to select whether messages are stored in the server 110 after delivery or removed after delivery has been confirmed. The user/administrator may also choose whether messages are deleted from the server 110 if these messages are removed from users' computing devices 122 because a response is provided, as described below The configuration block 134 may also allow the user/administrator to select whether the user can backup messages to the server or the user's own storage 125. In some embodiments, the configuration block 134 also allows the user/administrator to select whether the user can download some or all of the messages from the server to the user's computing devices 122. In addition, in some embodiments, the configuration block 134 allows the user/administrator to choose whether the user can obtain from the server certain messages that have been removed from the user's computing device.

Using the configuration block 134 the user/administrator may allow various participants to the session to be anonymous. In some such embodiments, other users may request the identity of these anonymous participants. The user/administrator may also select whether some or all of the users may obtain the identity of the anonymous participants. These and/or other features of the secure communication session may be configured and managed using the configuration block 134.

The message management block 132 may control the messages and interface with the remaining blocks 134 and 136. For example, the message management block 132 may control when and how message are sent, received and deleted. This control is performed based on the selections made by the user/administrator via the configuration block 134. The management block 132 may ensure that messages have not only the message data provided by the user 120A, 120B or 120C, but also additional data used in secure communication. For example, the management block may indicate in each message whether the message is to be part of a secure communication session and identify to which secure communication session the message is a part. Thus, the message management block 132 may provide a session indicator that performs one or both of these functions. The message management block 132 also provides a time indicator for each message. In some embodiments, for example, the message management block 132 marks the time at which the electronic messages are sent or received and provides a corresponding time indicator in the message. The message management block 132 may provide an indication of the order of the sent and received messages. For example, the message management block 132 may give a message number to each message sent by and received at the computing device 121. These messages may be placed in an order and controlled accordingly. For example, a first message received earlier than a second message that is sent may be higher in the order. The first message may be depicted above the second message on the display for the user interface 127 of a computing device. If the messages are also desired to be encrypted or otherwise processed, the message management block 132 may control such activities.

Figure 2:
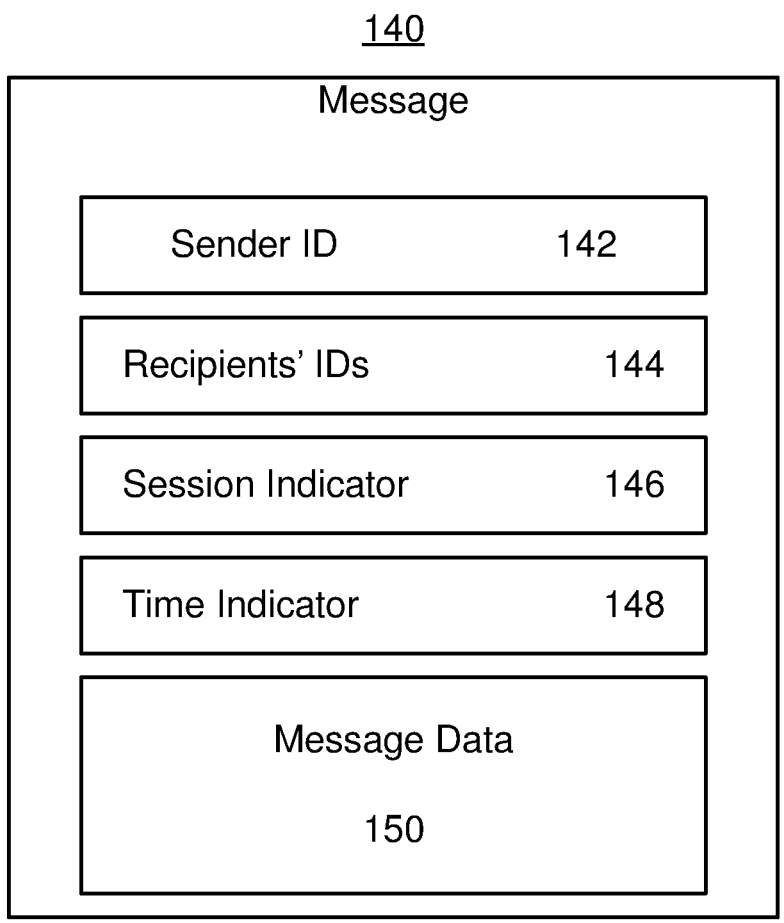
FIG. 2 is a diagram of an exemplary embodiment of a message used in secure electronic communication.

FIG. 2 is a diagram of an exemplary embodiment of a secure electronic communication, or message 140. Referring to FIGS. 1A, 1B and 2, the message 140 may be generated and managed using the systems 100 and 130. The message 140 may be a text message, a message in a chat session, an email, a social media post, a blog comment and/or another electronic communication. The message 140 includes a sender identity 142, recipient identities 144, a session indicator 146, a time indicator 148 and message data 150. The sender identity 142 is provided automatically by the system 100/130. For example, if a user 120A creates the message 140, the sender identity 142 may be the user 120A, the computing device 122A, 122B or 122C on which the message originated and/or all of the computing devices 122A, 122B and 122C associated with the user 120A and on which the message 140 may appear. The recipient identities 144 may be provided by the sender. If the sender is the user 120A, the recipient may be the user(s) 120B, 120C and/or 120D. The recipient identity may also include the computing devices 121 associated with each or the recipients 120B, 120C and/or 120D. The message data 150 may be text, images or other data that the sender desired to communicate to the other users.

The session indicator 146 indicates that the message is to be treated as a secure message and managed as described below. The session indicator 146 may include a flag or other mechanism set for any message that is to be treated as secure. In addition, the session indicator 146 also identifies the set of messages to which the message 140 belongs. For example, the session indicator 146 may identify the secure communication session of which the message 140 is a part, the users 120A, 120B, 120C and/or 120D that are taking part in the secure communication session, the server 110 and/or the computing devices 121 associated with the users 120A, 120B and 120C that are communicating securely. Thus, users 120A, 120B, 120C and/or 120D may participate in multiple secure communication sessions simultaneously. In some embodiments, the session indicator 146 identifies the secure communication session and/or set of messages associated with the message 140. The remaining information may be stored by the computing devices 121 and/or the server 110.

The time indicator 148 provides a mechanism for temporally ordering messages 140. For example, the time indicator 148 may be a send time, the receive time, a send position in an order of message sent, a receive position in an order of messages received and/or other analogous temporal indicator. The send time may the time the message 140 was sent from the sender's computing device 121 or received by the server 110 to be forwarded to recipient(s), depending upon the details of the embodiment. The receive time is the time message 140 was received by the server 110 or one or more of the recipient's computing devices 121, depending upon the details of the embodiment. The order number indicates the placement of the message 140 in a temporal order of the messages being exchanged via secure communication. For example, if three messages have already been exchanged in a particular secure communication session, such as a chat session, then the time indicator for the message 140 is four because the message 140 is the fourth message in the exchange.

In operation, a secure communication session may be configured and commenced. As used herein, a secure communication session may refer a clearly defined set of users and/or time for secure communication. The term secure communication session may also refer to a set of messages 140 through which electronic communication may be carried out securely in the manner described herein. In this case, the session may not have predefined start and end points. The user/administrator may configure the secure communication session by setting up a secure communication session and providing the necessary information. Alternatively, a user/administrator may configure the secure communication session simply by preparing an electronic communication, such as a message 140, to other participants in the secure communication session (e.g. users 120B and 120C) and indicating in the message 140 that the electronic communication is the be secure.

Information provided to configure a secure communication session may include providing the identity of the users that may take part in the secure communication session, the conditions for termination of the session, parameters related to the management of messages and other rules by which the systems 100 and 130 operate. The user can provide this information to the system 100 and configuration block 134 via user interface 127. For example, the user 120A may be the administrator/individual that configures the secure communication session. The user may do so using only an app residing on the user's computing device 121 or by accessing the server 110 and providing the information to the server 110. For example, the user interface 127 may include a control panel provided by the configuration block 134. The user 120A may input the identities of users 120A, 120B and 120C as taking part in secure communication session. The information for each user may also include the computing devices 121 for that user through which secure communication can take place. In some embodiments, secure communication only takes place on those computing devices on which at least some part of the functional system 130 resides. For example, secure communication may take place only on computing devices 121 having the corresponding secure communication application 130. Alternatively, each user may register one or more of their devices for participation in the secure communication sessions. If the secure communication session is to occur in the future, the user 120A may also set the start time or other conditions which start the secure session. If the user configures the secure communication system by preparing the message 140, then the secure communication system may commence when the message 140 is sent or received. As part of configuring the secure communication to take place, the user 120A may also select conditions for terminating the secure communication session. For example, the user 120A may indicate a time length for the session (e.g. thirty minutes from the start), a particular end date/time, or a condition that is to be fulfilled for the session to end. The condition might be a reply message from all of the members of the group and/or other conditions, a particular number of electronic communications being exchanged between the users, or other condition that may be fulfilled. Alternatively, the secure communication system may be open ended. In such a case, the user may expressly end the communication system.

One or more messages 140 may be exchanged between the computing devices 121 of the users 120A, 120B and 120C. This exchange may take place through the server 110. For example, the server 110 may receive each message 140, determine the recipients and pass the message 140 on to the recipients. In other embodiments, the messages 140 may be transferred through the internet 120 directly between some or all of the computing devices 121. In some embodiments, the messages 140 are provided to each computing device 121 that participates in the secure communication session. For each user 120A, 120B and 120C, therefore, the messages may appear on multiple devices. For example, the messages 140 may be displayed on the devices 122A, 124A and 126A for the user 120A. These devices 122A, 124A and 126A may all be the same (e.g. all smart phones) or different (e.g. a smart phone, a tablet and a laptop). Similarly, the messages 140 may be displayed on the computing devices 122B and 124B for the user 120B. Note, however, that all of a user's computing devices need not be registered/take part in a secure communication session. Instead, one or more of the computing devices might be excluded by the user.

In some embodiments, the server 110 removes any copies of each message 140 once the server 110 has received an acknowledgement from each recipient computing device 121 that the message has been received. For example, if the user 120A sends the message from device 122A, the server 110 may remove the message from its memory 114 once receipt acknowledgements have been received from the devices 124A, 126A, 122B, 124B and 122C. In other embodiments, messages are not removed from the memory 114 of the server 110 after the message has been received at the recipient computing device 121. If the messages are not removed from the server 110, the users may be allowed to download messages from the server 110 to their computing device 121 or backup messages to the server 110. In such embodiment, other criteria may be used for removal of the message from the server 110. For example, the message(s) may only be removed from the memory 114 after termination of the communication session and/or on a rolling basis.

Thus, the message(s) are provided to the users' computing devices 121. The messages are stored on the recipients' computing devices 121 until removal based on a response (a described below), the termination of the secure computing session, or (in some embodiments) a particular time has expired. As a result, a user does not need to rush to read the message(s). Instead, the message(s) may be retained on the users' computing devices 121 until the user has an opportunity to review and respond to the message(s).

After receiving one or more of the messages 140, a user 120A, 120B and/or 120C may wish to provide a response. This response may take various forms. The response may be a response message to a particular message, a new message, or simply clearing the message. For example, suppose the user 120B wishes to reply to or forward a previous message from user 120A. In order to clear all messages before a particular message, the user may simply select the particular message and select a clear function provided by the system 130. The particular message and all previous messages (if any) are removed without requiring the user to individually select the previous messages. If all messages are desired to be removed, then the clear function may be invoked without selecting a particular message. Alternatively, the user 120B may wish to reply to or forward a particular message from user 120A. To do so, the user 120B selects the particular message for response on device 124B. Thus, as used herein, a response message includes a reply and/or a forward. The user prepares the response message using data block 136 and sends from the computing device 124B. In some embodiments, the response message may not include any content. Thus, the user 120B may opt to send a blank message. In other cases, the response message may be a new message. The new message may also be blank (lacking in content). This new message may be sent to the other participants as part of the secure communication session. Because the new message is part of the ongoing conversation, the new message is considered to be a response message. The response message may then appear on the computing devices 122A, 124A, 126A, 122B, 124B and 122C.

In response to an event required for this (possibly blank) response message being sent or the clear function being selected, the previous message to which the user 120B is responding and any older message that is part of the secure communication session is automatically deleted from all of the computing devices 122B and 124B of the sender 120B. In some embodiments, the system 130 may be configured such that entry of data for the response message is treated the same as sending the response message. Thus, in some embodiments, the older messages are deleted in response to the user 120B typing in the content for the response message. In such an embodiment, older messages are deleted based on the response message being prepared without requiring the response message to actually be sent from the computing device 122. In some embodiments, this deletion is performed such that the message is not recoverable by the user. Thus, once the older messages are deleted, the user may not access the messages on their computing devices 121. In an alternate embodiment, the deleted messages may be recovered until termination of the secure communication session.

The determination of whether a message 140 is to be removed employs the time indicator 148. However, the previous message and older messages are not removed from the computing devices 122A, 124A, 126A and 122C of the recipients 120A and 120C/other users. In some embodiments, if the user 120B simply initiates a message that is part of the secure communication session, none of the older messages are removed. In such an embodiment, older messages are removed only if the response message is to a previous message that the user expressly selects. In other embodiments, however, if a user initiates a new message after other messages that are part of the secure communication session are received, then all of the older messages are removed in response to the new message being sent. This is because the new message may be considered to be a reply to the last message received on the computing devices 121 of the user 120B. Removals performed in this manner are considered to be non-temporal because they are based not based on the expiration of a specified time period. Instead, the messages are removed in response to a specific event: selection of a clear function or sending of a response message. In some embodiments, however, one or more of the messages 140 may also have an expiration time. Such message(s) are removed the earlier of the expiration time and based on a later response being provided. This expiration time may be set by the user(s) 120A, 120B and/or 120C. Thus, the expiration time may be long—on the order of hours or days—to ensure that the users 120A, 120B and 120C have an opportunity to view the messages 140.

This process of saving and displaying all messages for the user 120A, 120B and 120C on all of their (registered) computing devices 121 and then automatically deleting previous messages in response to a response being provided continues until termination of the secure communication session. Upon termination of the session, all messages may be deleted from all of the computing devices 121. Alternatively, the messages need not be removed from the participating computing devices 121 upon termination of the session. In some such embodiments, all information relating to the secure communication session, including but not limited to the users participating, is also deleted. In other embodiments, any message that have not been responded to are not deleted but instead remain on the users' devices.

The systems 100 and 130 may facilitate secure communication between users. The messages 140 are stored and displayed on all of the users computing devices 121. The messages 140 also need not have a specific expiration time and need not be encrypted or decrypted. Thus, the users 120A, 120B and 120C may have ample opportunity to review the messages 140. The users may also do so relatively easily. The messages 140 are automatically deleted after a response has been provided. This response may take the form of selection of a clear function that removes previous messages or sending a response message as defined above. This helps to ensure that once the user has read the messages 140 that are part of the secure communication session, these messages 140 are no longer available for storage and copying from the users' computing devices 121. Stated differently, the message(s) may be irrevocably removed. Thus, the communication may remain private. In an alternate embodiment, messages deleted from users' computing devices because a response has been provided may be recalled if they are stored by the server 110. Deleting all remaining messages at the termination of the secure communication session also aids in keeping the content of the messages 140 private. This is accomplished without requiring the users 120A, 120B and/or 120C to decrypt messages or to view the messages 140 within a particular time. Thus, secure communication may be facilitated for the users.

Figure 3:
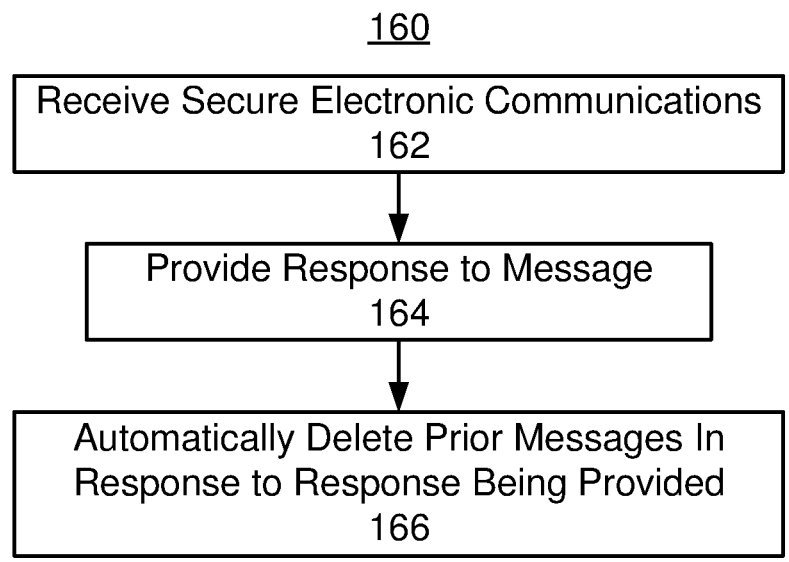
FIG. 3 is a diagram depicting a flow chart of an exemplary embodiment of method for providing secure communication.

FIG. 3 is a diagram depicting a flow chart of an exemplary embodiment of method 160 for providing secure communication. FIGS. 4A-4E are block diagrams depicting exemplary embodiments of the user interfaces for computing devices with which the method 160 is used. The method 160 is described in the contexts of system 100 and 130 and the message 140. However, the method 160 may be performed using other systems and other message(s). The method 160 may be performed by software component(s), such as the system 130, executing on one or more processors. Some steps may be omitted, combined, performed in another order, performed in parallel, and/or include substeps. For simplicity, the method 160 is described in the context of the user 120A receiving messages on the computing devices 122A, 122B and 122C and in the context of the users 120A, 120B and 120C communicating securely. However, the method 160 may be generalized to other users and other computing devices.

Figure 4A:
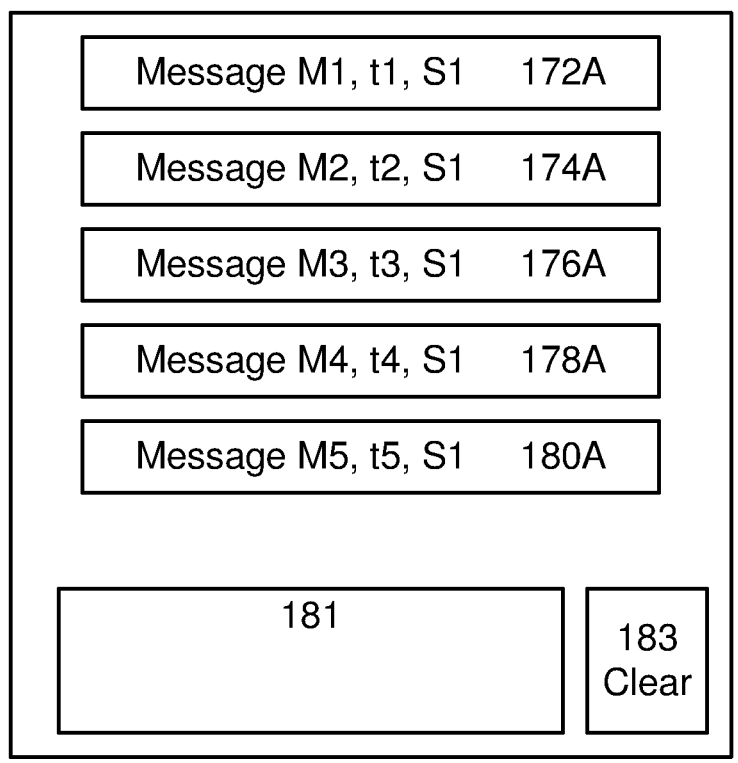
FIGS. 4A-4E are diagrams of exemplary embodiments of a computing devices depicting secure communications.

Messages 140 are received by the computing devices 122A, 122B and 122C of the user 120A participating in secure electronic communication, via step 162. In parallel with step 162, the messages 140 are also received by the other users' computing devices 122B, 124B and 122C. Step 162 includes storing and displaying the messages on the computing devices 122A, 122B and 122C. FIG. 4A depicts a display 127' of one device 122A' that has received multiple secure messages 140. The display 127' is denoted by reference numeral 127' because the display 127' may be part of input/output device 127 of the computing device 122A. The messages 172A, 174A, 176A, 178A and 180A are shown. Also shown are entry box 181 in which the user 120A may enter data for a message and clear button 183 which may be used to remove all or selected previous messages. Each of the messages 172A, 174A, 176A, 178A and 180A is analogous to the message 140. Thus, each message 172A, 174A,

176A, 178A and 180A contains messages data M1, M2, M3, M4 and M5, respectively, time indicator t1, t2, 3, t4 and t5, respectively, and session indicator S1. Note that because all of the messages 172A, 174A, 176A, 178A and 180A shown are part of the same secure communication session, the session indicator S1 for the messages match. In the embodiment shown, the messages 172A, 174A, 176A, 178A and 180A are listed in temporal order. Thus, message 172A has the earliest time indicator t1, while message 180A has the latest temporal indicator t5. In another embodiment, the messages 172A, 174A, 176A, 178A and 180A may be presented in another order. Although each message 172A, 174A, 176A, 178A and 180A has a temporal indicator t1, t2, t3, t4 and t5, respectively, the messages 172A, 174A, 176A, 178A and 180A may not have an expiration time. In some embodiments, each of the messages 172A, 174A, 176A, 178A and 180A is removed from the server 110 in response to an indication that the message 172A, 174A, 176A, 178A and 180A has been received by all of the relevant computing devices 121. The message 172A, 174A, 176A, 178A and 180A may remain displayable on the user's computing devices 121 regardless of whether the user is currently participating in the session. Thus, a user may leave for some time and return to view messages that have been received up through the current time. Also shown is entry box 181.

A response to one or more of the messages 172A, 174A, 176A, 178A and 180A is provided, via step 164. In some embodiments, step 164 may include receiving the user's selection of the clear button 183. For example, the user 120A may read the messages 172A, 174A, 176A, 178A and 180A and simply not wish to reply. Selection of the clear button 183 can be considered a response that automatically results in the message 172A, 174A, 176A, 178A and 180A being deleted from the user's computing devices as described below.

Figure 4B:
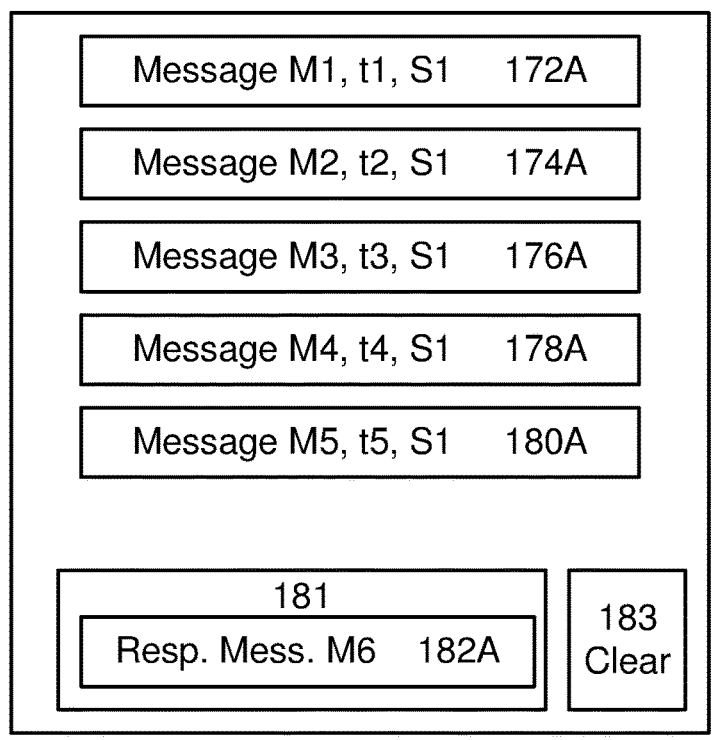

Step 164 may include sending a response message to one or more of the messages 172A, 174A, 176A, 178A and 180A. For the purposes of message removal in accordance with the methods described herein, sending a response message may include but is not limited to entering content for the response message, receiving an indication that the user wishes the response message to be sent, sending of the response message (e.g. the response message leaving the user's computing device 121), receiving the response message at the server 110, receiving an acknowledgment from the server 110 or recipients' computing device that the response message is received, or another analogous event that occurs in the course of providing the response message. Thus, the user may select one of the messages 172A, 174A, 176A, 178A and 180A for response via user interface 127/127'. Alternatively, the user might simply initiate a message in entry box 181. The user may enter data for the response message content into the entry box 181. The user 120A may be allowed to select a subset of the remaining users 120B and 120C to receive the response message. Alternatively, the user 120A may select all of the remaining users 120B and 120C or all of the remaining users may be automatically entered as recipients by the system 100/130. The user 120A may also indicate whether the message is a reply message, a forward of the previous message or other type of message. FIG. 4B depicts the display 127' during step 164. Message data may also be selected or provided by the user for the response message. Thus, a response message 182A is being entered. In addition, the previous message 176A to which the response message 182A is made is highlighted.

The response message 182A may also be sent from the computing device 122A to the users 120B and 120C as part of step 164. Step 164 may thus include receiving a selection of a send command and/or sending the response message 182A to the computing devices 122B, 124B and 122C. These messages may be routed using the server 110. In addition, the response message 182A may be sent to the remaining devices 124A and 126B of the sender 120A. This allows all of the user's devices 122A, 122B and 122C to have a current record of the communication. Acknowledgements may be received from the server 110 or other computing devices 121 to indicate that the response message sent from the user has been received. The response message 182A is stored and displayed on the recipients' computing devices 121 in a manner analogous to that described in step 162.

Because the response is provided, a portion of the previous messages 172A, 174A, 176A, 178A and 180A is automatically removed from the computing devices 122A, 124A and 126A of the sender 120A, via step 166. Thus, prior message may be removed in response to some event in required for the response message to be sent or in response to the clear function being selected, In some embodiments, the removal may take place in response to the user 120A selecting "send", for example by clicking a button or with some other recognized gesture. Because the user 120A can select send without entering data into the entry field 181, the user 120A need not actually enter content to have a response message be considered sent. In other embodiments, the removal may be in response to the response message 182A leaving the computing device 122A for example by traversing network communication device 129. In other embodiments, the removal may be performed in response to an acknowledgement that the server 110 has received the response message 182A. In some such embodiments, the server 110 may also provide a removal command to the user's devices 122A, 124A and 126A as part of or in addition to the acknowledgement. In other embodiments, the removal may take place in response to an acknowledgement that the computing devices 124A, 126A, 1228, 1248 and 122C have received the response message 182A. Alternatively, the removal may be in response to another indicator that the response message 182A has been sent. In alternate embodiments, the removal may be in response to the user entering data into the entry field 181. Thus, the response message need not actually be sent for a response to be considered to have been provided and the corresponding previous messages removed. As discussed above, in some embodiments, receiving the selection of the clear button 183 may be considered to be a response that results in the removal of the previous messages 172A, 174A, 176A, 178A and 180A. In some embodiments, the messages may also be removed from the server 110 as part of step 166.

The portion of the messages 172A, 174A, 176A, 178A and 180A selected for removal in step 166 are based on the time indicators t1, t2, t3, t4 and t5 as well as the session indicator S1. Only messages that are part of the secure communication session are removed. Thus, only messages having a session indicator S1 are removed. Messages that are part of a different secure communication session or are unsecured are not removed in step 166. The message 176A being responded to is removed. Further, only those messages that are considered at the same time as and/or prior to the message 176A are removed. In the embodiment shown, messages 172A and 174A are also removed because they are considered to have been viewed by the user 120A. This determination is made because the user 120A has elected to respond to a message 176A having a later time indicator (later in time/further down in the order).

The removal in step 166 may also be performed such that the previous messages are irretrievable. Thus, the removal deletes the message from the memory 125-1 of the device and from the cloud 125-2. If the previous messages have not already been deleted, the messages 170A, 172A 174A and 176A are removed from any portion of the memory 114 associated with the user 120A on the server 110. The messages 170A, 172A 174A and 176A may also be deleted from any other memory (not shown) for the user 120A. Alternatively, the removal of messages in step 166 may be completed such that some or all of the messages may be retrieved, for example from the server 110. Finally, in some embodiments removal of the messages may also include removal of other indicia of the message including but not limited to screen shot(s) of any of the messages.

Figure 4C:
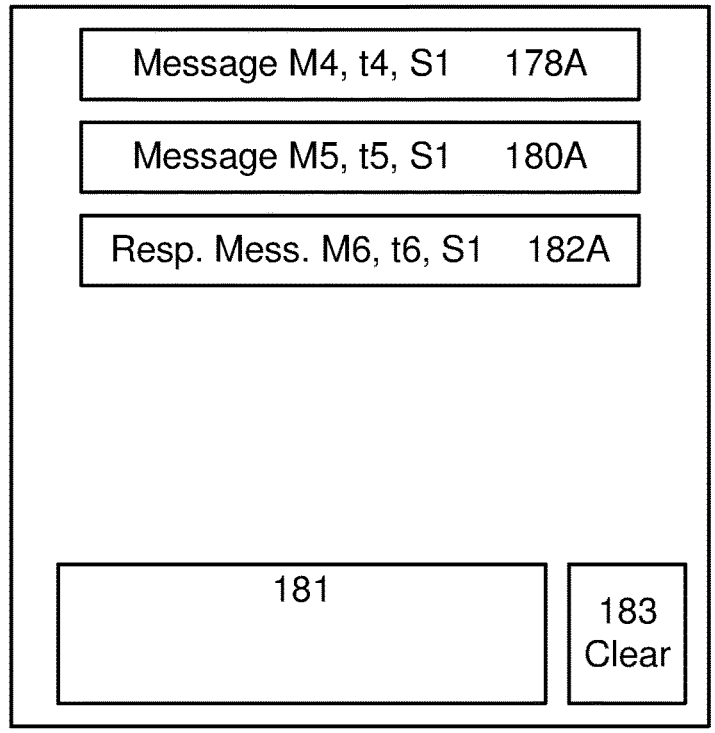
Figure 4D:
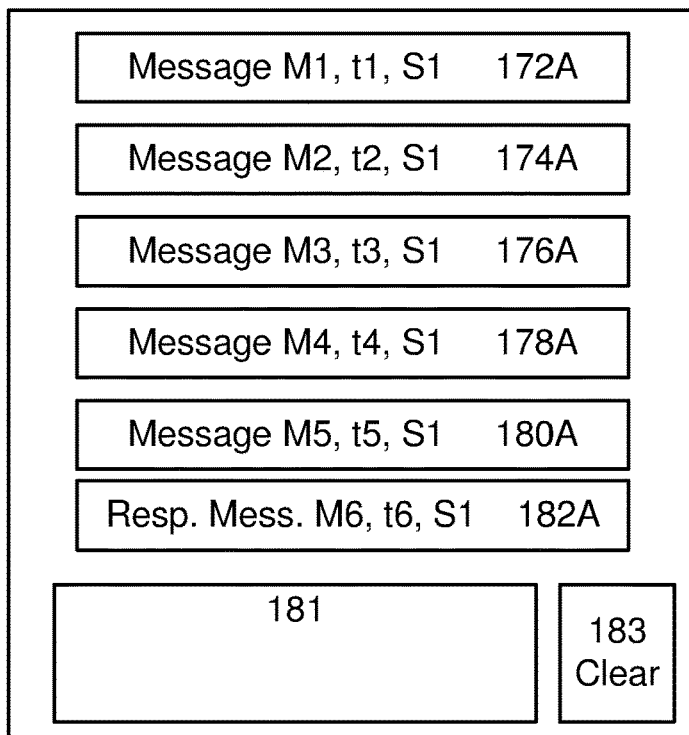
Figure 4E:
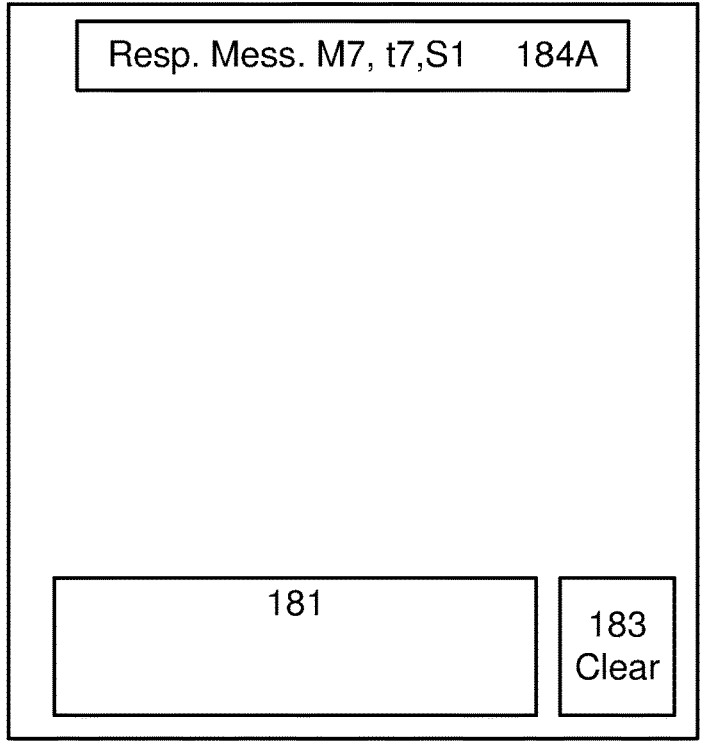

FIG. 4C depicts the display 127' of the computing devices 122A, 124A and 126A after step 166 is performed. Thus, the messages 172A, 174A and 176A have been removed. Messages 178A and 180A having time indicators t4 and t5 after that of the messages 176A remain. In addition, the response message 182A having time indicator t6 and session indicator S1 is shown. FIG. 4D depicts the display 127" of the computing device 122B of the user 120B. The user 120B is a recipient of the response message 182A. Thus, the messages 172A, 174A, 176A, 178A and 180A are all still depicted on the device 122B. This is because the user 120B has not responded to any of the message 172A, 174A, 176A, 178A and 180A. Also shown is the response message 182A, which has been received. FIG. 4E depicts the display 127' of the computing device 122A of the user 120A after an additional response message 184A has been made. This response message 184A was in response to the last message in the secure communication session, such as the response message 182A. In some embodiments, the user 120A has selected the message 182A as being responded to. In other embodiments, the user 120A can simply initiate a new message. Thus, all previous messages 172A, 174A, 176A, 178A, 180A and 182A have been removed in step 166.

Using the method 160, secure communication between the users 120A, 120b and 120C may be facilitated. The messages are stored and displayed on all of the users computing devices 121 without requiring a short expiration time or encryption/decryption. Thus, the users 120A, 120B and 120C may have sufficient opportunity to review the messages 170A, 172A, 174A, 176A, 180A, 182A and 184A. Prior messages that are part of the secure communication session are automatically deleted from the sender's computing devices 122A, 124A and 126A after a response message 182A or 184A has been sent, the clear button 183 is selected, or data for a response message has been entered into the entry field 181. This helps to ensure that once the user has read the messages 170A, 172A, 174A and 176A that are part of the secure communication session, these messages 170A, 172A, 174A and 176A are no longer available for storage and copying. Thus, the communication may remain private. Deleting all remaining messages at the termination of the secure communication session also aids in keeping the content of the messages private. Thus, secure communication may be facilitated for the users.

For example, suppose a user configures a secure communication session such that messages are automatically deleted only in response to a user sending a response message or upon termination of the secure communication session. Unless the secure communication session has been terminated, the users may then continue to exchange messages electronically. Referring to FIG. 4A, the messages 172A, 174A, 176A, 178A and 180A may be stored and displayed on a user's computing device 122A'. These messages 172A, 174A, 176A, 178A and 180A remain on the user's device regardless of whether the user is actively participating in the communication session. For example, a user may walk away from the computing devices 121 for an extended period of time. When the user returns, the messages 172A, 174A, 176A, 178A and 180A are still available for viewing and response. The user can view the messages 172A, 174A, 176A, 178A and 180A once or repeatedly without the messages 172A, 174A, 176A, 178A and 180A being removed. This changes once a user responds to a message. Suppose the user desires to respond to the message 176A. The user may type in a response message 182A in the entry box 181. This situation is depicted in FIG. 4B. The user then selects a send command. In response, the messages 176A being responded to and all previous messages that are part of the same communication session are removed. In addition, the new message 182A is made available as part of the continuing electronic conversation. This is shown in FIG. 4C. Thus, message 182A has appeared and messages 172A, 174A and 176A have been removed from the user's computing devices 122A'. However, these messages 172A, 174A, 176A, 178A, 180A and 182A may remain on another user's computing device. Another user's computing device 124B' is shown in FIG. 4D. Because this user has not responded to a message, all of the messages 172A, 174A, 176A, 178A, 180A and 182A remain on this user's computing device 124B'. This process of saving and displaying messages for each user until a response is provided by that user may continue throughout the communication session. Upon termination of the communication session, all of the messages may (or may not) be removed. Thus, as discussed above, it is better ensured that a user can read messages that are part of the secure communication session, while allowing for automatic removal of messages to which the user has responded. Thus, private, secure electronic communication may be facilitated.

Figure 5:
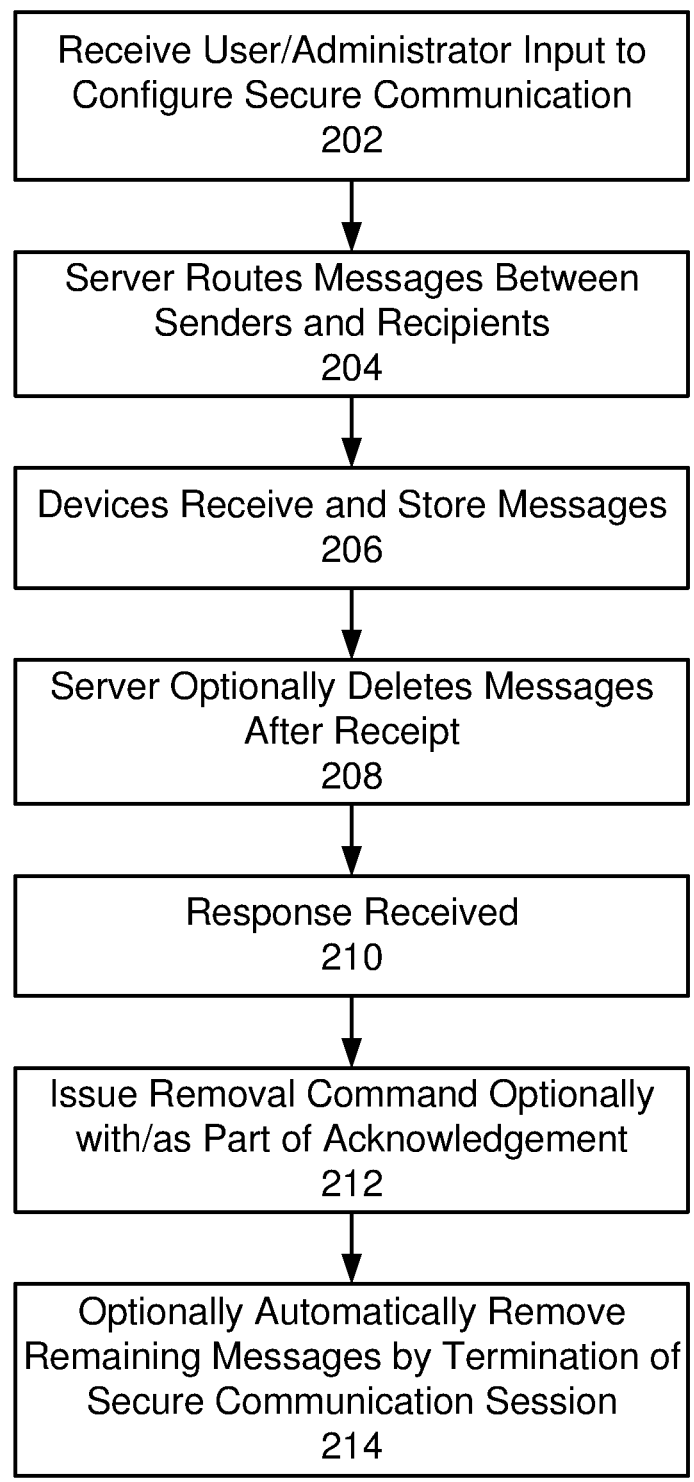
FIG. 5 is a flow chart depicting another exemplary embodiment of a method for providing secure communication.

FIG. 5 is a flow chart depicting another exemplary embodiment of a method 200 for providing secure communication. The method 200 may be considered an instance of the method 160. The method 200 is described in the contexts of system 100 and 130 and the message 140. However, the method 200 may be performed using other systems and other message(s). The method 200 may be performed by software component(s), such as the system 130, executing on one or more processors. The method 200 is used in a system 100 in which at least portion of the system 130 is executed by the processor(s) 112 on the server. Some steps may be omitted, combined, performed in another order and/or include substeps. For simplicity, the method 200 is described in the context of the user 120A receiving messages on the computing devices 122A, 1226 and 122C and in the context of the users 120A, 120B and 120C communicating securely. However, the method 200 may be generalized to other users and other computing devices.

Input from the user 120A that configures the secure communication session is received by the server 110, via step 202. The user 120A provides input to the configuration block 134 that may be executed in part or in whole on the server 110. For example, the user 120A may employ a computing device 124A to communicate with the server 110. The parameters described above, such as the participants, the conditions for terminating the session, whether messages are stored on the server 110, whether messages are retrievable, what constitutes a response (e.g. selection of a clear function, entry of text into the entry field 181, selection of the send command for the response message, and/or actual sending of a response message), whether all previous messages or only a portion of them are removed by the method 200 and other variables may thus be defined.

The server 110 routes messages 140 that are part of the secure communication session to the appropriate recipients, via step 204. The computing devices 122A, 124A, 126A, 122B, 124B and 122C thus receive, store and display the messages, via step 206. The server 110 may delete each message form memory 114 once an indication that all of the computing devices 122A, 124A, 126A, 122B, 124B and 122C have received each message. Alternatively, some or all of the messages may remain stored in the memory 114. These messages may have an expiration time on the server 110 after which they are removed, may be removed after termination of the session, may be removed based on available memory or may be removed based on other factors.

A response is received from one of the users' computing devices 122A, 124A, 126A, 122B, 124B and/or 122C, via step 210. One or more of the users 120A, 120B and/or 120C may have selected a message to respond to, initiated a new message or selected the clear button 183. An indication that the user 120A, 120B and/or 120C has entered content into the entry field 183 for the response message, that the user has opted to send the response message, that the response message is received at the server or that the user has selected the clear function may be received in step 210. Other indicia of the response message being provided or the clear function being selected may be received as part of step 210

In response to receiving the response in step 210, the server 110 may issue a delete command to the sender's computing devices 121, via step 212. The delete command specifies that the message that is being responded to and any prior messages are to be deleted. Step 212 may include the server 110 providing an acknowledgement to the sender's computing device(s). The removal command may be part of or in addition to the acknowledgement. The server 110 may send the delete command individually to each of the sender's devices. Alternatively, the server 110 may send the delete command to one of the sender's devices. The sender's devices then communicate with each other or the server to ensure that the appropriate messages are deleted. In some embodiments, any messages that are being removed from the sender's computing devices 121 and that have been stored on the server 110 are also deleted from the server 110 in step 212.

Any remaining messages that are part of the secure communication session may optionally and automatically be deleted by the termination of the secure communication session, via step 214. Thus, the server 110 may issue an analogous delete command for all messages on all users' computing devices 121. The computing devices 121 perform the deletion. In some embodiments, step 214 includes removing all information related to the secure communication session from the server 110 and, in some embodiments, the computing devices 121.

Using the method 200, secure communication between the users 120A, 120b and 120C may be facilitated. The users 120A, 120B and 120C may have ample opportunity to review the messages. Prior messages that are part of the secure communication session are automatically deleted from the sender's computing devices after a response message has been sent. This helps to ensure that once the user has read the messages that are part of the secure communication session, these messages are no longer available for storage and copying. Thus, the communication may remain private. Deleting all remaining messages at the termination of the secure communication session also aids in keeping the content of the messages private. Thus, secure communication may be facilitated for the users.

Figure 6:
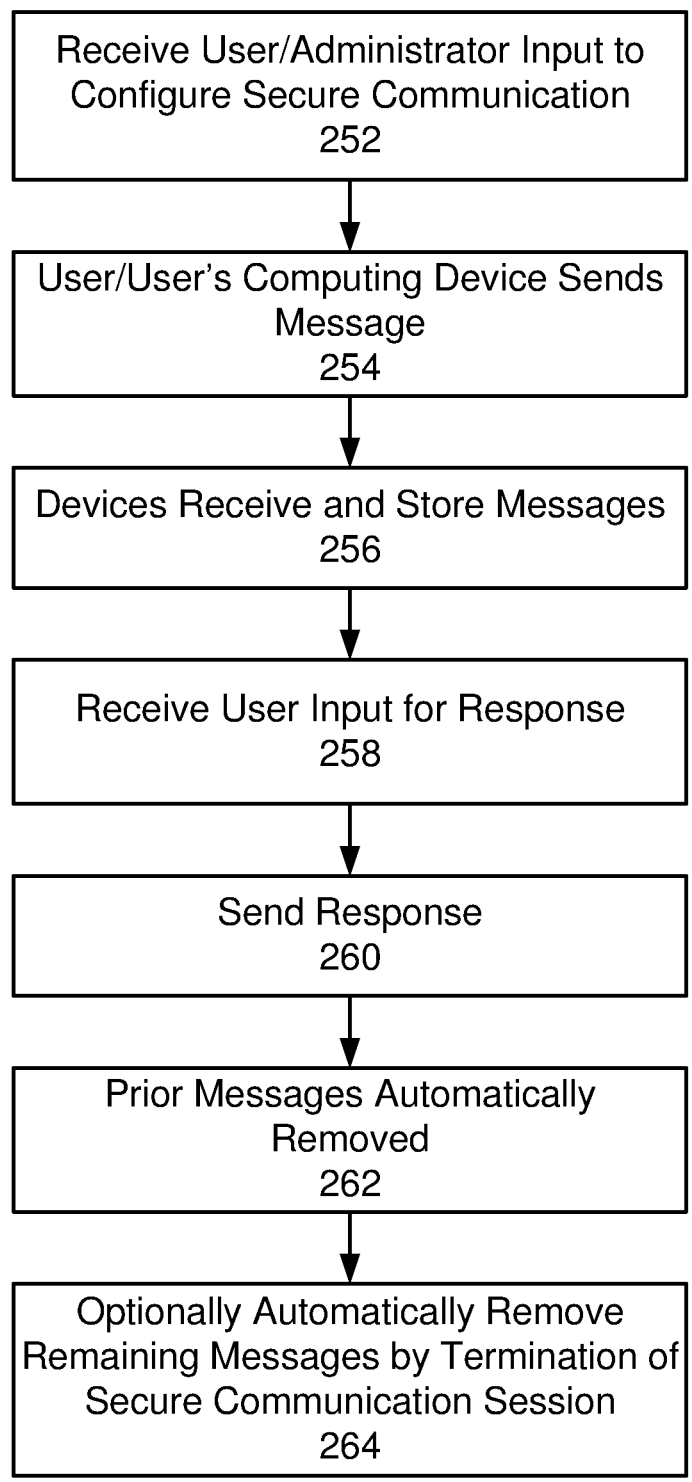
FIG. 6 is a flow chart depicting another exemplary embodiment of a method for providing secure communication.

FIG. 6 is a flow chart depicting another exemplary embodiment of a method 250 for providing secure communication. The method 250 may be considered an instance of the method 160. The method 250 is described in the contexts of system 100 and 130 and the message 140. However, the method 250 may be performed using other systems and other message(s). The method 250 may be performed by software component(s), such as the system 130, executing on one or more processors. The method 250 is used in a system 100 in which at least portion of the system 130 is executed by the processor(s) 123 on the computing devices 121. Some steps may be omitted, combined, performed in another order and/or include substeps. For simplicity, the 250 is described in the context of the user 120A receiving messages on the computing devices 122A, 122B and 122C and in the context of the users 120A, 120B and 120C communicating securely. However, the method 250 may be generalized to other users and other computing devices.

Input from the user 120A that configures the secure communication session is received by the computing device selected by the user 120, such as the computing devices 124A, via step 252. The user 120A provides input to the configuration block 134 that may be executed in part or in whole by the processor(s) 112. The configuration in step 252 may be performed as part of inputting the message 140 that is to start the secure communication session or may be separately performed. The computing device 124A may also provide relevant information to the server 110, such as data related to the users 120A, 120B and 120C that are participants in the secure communication session. The parameters described above, such as the participants, the conditions for terminating the session, whether messages are stored on the server 110, whether messages are retrievable, what constitutes a response (e.g. entry of text into the entry field 181 or sending of a response message), whether all previous messages or only a portion of them are removed and other variable may thus be defined.

It the user 120A is to start the session, then the user 120A may send a message 140 that commences the secure communication session, via step 254. This message 140 may have been provided as part of the configuring step 252 or may be input separately. Step 254 may include storing and displaying the first message 140 on the computing devices 122A, 124A and 126A of the sender 120A. Alternatively, another user may send the first message 140 after/as part of the start of the secure communication session.

Messages 140 that are part of the secure communication session are received, stored, and displayed by the computing devices 122A, 124A, 126A, 122B, 124B and 122C, via step 256. The message management block 132 residing on the computing devices 121 may control these activities. The messages 140 may still be routed through the server 110. The server 110 may delete each message form memory 114 once an indication that all of the computing devices 122A, 124A, 126A, 122B, 124B and 122C have received each message.

Input for a response is received on one or more of the computing devices 122A, 124A, 126A, 122B, 124B and/or 122C, via step 260. Thus, one or more of the users 120A, 120B and/or 120C may have selected a message to respond to, initiated a new message or selected a clear function. If input is received for a response message, the recipients may be selected and the message content 150, if any, provided.

The remaining information 142, 144, 146 and 148 may be automatically provided by at least part of the system 130 on the computing devices 121. The user 120A, 120B and/or 120C also opts to send the response message.

The response is sent, via step 260. Sending the response may include actually sending the response message 140 from the computing device to selected users, initiation of the user entering data for the message (i.e. when the user starts typing the response message), confirmation of the user's selection of the clear button 183 or simply the next step in the clear function. Step 260 may include the computing device 122A, 124A or 126A being employed by the user sending the response message 140 to the server 110 or directly to the other devices 122B, 124B and 122C. The response message may also be sent to the sender's remaining computing devices either by direct communication between the devices or via the server 110.

In response to the response being provided, prior messages are automatically deleted from the sender's computing devices 121, via step 262. Thus, prior message may be removed in response to some event in required for the response message to be sent or in response to the clear function being selected. The events required for sending the message include but are not limited to the user starting to enter data for the response message, the response message actually being sent from the user's computing device 121, an acknowledgement that the server has received the response message, or an acknowledgement that the remaining users have received the response message. The message that is being responded to and any prior messages that are part of the secure communication session are deleted in step 262. If no message is selected for response, then all previous messages may be removed in step 262. Step 262 deletes these messages from all of the user's devices 122A, 124A and 126A. In some embodiments, these messages may also be removed from the server 110 if they had not previously been deleted.

Any remaining messages that are part of the secure communication session may optionally and automatically be deleted by the termination of the secure communication session, via step 264. In some embodiments, step 264 includes removing all information related to the secure communication session from the computing devices 110 and, in some embodiments, the server 110.

Using the method 250, secure communication between the users 120A, 120b and 120C may be facilitated. The users 120A, 120B and 120C may review the messages at their leisure. Prior messages that are part of the secure communication session are automatically deleted from the sender's computing devices after a response message has been sent. This aids in ensuring that once the user has read the messages that are part of the secure communication session, these messages are no longer available for storage and copying. Thus, the communication may remain private. Deleting all remaining messages at the termination of the secure communication session also aids in keeping the content of the messages private. Thus, secure communication may be facilitated for the users.

A method and system for a providing multi-participant secure communication has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

What is claimed is:

1. A method for securing electronic communication between a plurality of users utilizing a plurality of computing devices, the method being performed by at least one software component executing on at least one processor and comprising:

receiving a plurality of messages on a computing device of a user of the plurality of users, the computing device being one of the plurality of computing devices, the plurality of messages being from at least two other computing devices of the plurality of computing devices, each of the plurality of messages having a time indicator and a session indicator;

providing a response to a message of the plurality of messages, the response including at least one of sending a response message from the computing device and receiving a selection of a clear function from the user; and in response to the response providing step, automatically removing from the computing device the message and a portion of the plurality of messages, the portion of the plurality of messages including all messages having an earlier time indicator than the time indicator for the message, having the session indicator and being from the at least two other computing devices.

2. The method of claim 1 wherein the message is at least one of a chat message, an email, a text message, a social media post and a blog comment.

3. The method of claim 1 wherein the plurality of messages is for a communication session and wherein the step of providing the response further includes:

sending the response message to a server associated with the communication session, the server for providing the response message to a remaining portion of the plurality of computing devices.

4. The method of claim 3 wherein the step of automatically removing the portion of the plurality of messages further incudes:

receiving from the server an acknowledgment of receipt of the response message, the acknowledgment including an indication from the server that the portion of the plurality of messages is to be removed, the step of automatically removing being performed in response to the acknowledgement.

5. The method of claim 3 wherein the receiving step includes receiving each of the plurality of messages from the server and wherein the each of the plurality of messages is removed from the server in response to receiving an acknowledgment indicating that the each of the plurality of messages has been received.

6. The method of claim 1 wherein the plurality of users, the plurality of messages and the response message are associated with a secure communication session.

7. The method of claim 1 wherein the time indicator is selected from a send time, a receive time, a receipt position in a message receipt order, and a send position in a message sending order.

8. A method for securing electronic communication between a plurality of users utilizing a plurality of computing devices, the method being performed by at least one software component executing on at least one processor and comprising:

sending a plurality of messages to the computing device of a user of the plurality of users, the computing device being one of the plurality of computing devices, the plurality of messages from at least two other users of the plurality of users, each of the plurality of messages having a time indicator and a session indicator;

receiving from the computing device of the user a response to a message of the plurality of messages, the response including at least one of receiving a response message from the computing device and receiving a selection of a clear function from the user; and in response to the receiving step, automatically sending to the computing device of the user a command to remove the message and a portion of the plurality of messages, the portion of the plurality of messages including all messages having an earlier time indicator than the time indicator for the message, having the session indicator and being from the at least two other computing devices.

9. The method of claim 8 wherein the step of sending the plurality of messages includes removing each of the plurality of messages from the server in response to receiving an acknowledgment indicating that the each of the plurality of messages has been received.

10. The method of claim 8 wherein the plurality of users, the plurality of messages and the response are associated with a secure communication session.

11. An electronic communication system for a plurality of users using a plurality of computing devices, the system comprising:

a secure communication system executing on a computing device of a user of the plurality of users, the computing device being one of the plurality of computing devices, the secure communication system receiving plurality of messages from at least two other computing devices of the plurality of computing devices, each of the plurality of messages having a time indicator and session indicator, the secure communication system storing the plurality of messages on a memory of the computing device, the secure communication system further providing a response from the computing device, the response including at least one of sending a response message from the computing device to a remaining portion of the plurality of computing devices and receiving a selection of a clear function from the user, the communication component further automatically removing from the computing device the message and a portion of the plurality of messages in response to providing the response, the portion of the at least one message including all messages having an earlier time indicator than the time indicator for the message, having the session indicator and being from the at least two other computing devices.

12. The electronic communication system of claim 11 wherein the message is at least one of a chat message, an email, a text message, a social media post and a blog comment.

13. The electronic communication system of claim 11 wherein the plurality of messages is for a communication session and wherein the secure communication system sends the response message to a server associated with the communication session, the server for providing the response message to the remaining portion of the plurality of computing devices.

14. The electronic communication system of claim 13 wherein the secure communication system removes the portion of the plurality of messages in response to receiving from the server an acknowledgment of receipt of the response message, the acknowledgment including an indication from the server that the portion of the plurality of messages is to be removed.

15. An electronic communication system for a plurality of user utilizing a plurality of computing devices, the system comprising:

at least one processor for executing a secure communication system that controls electronic communication between the plurality of computing devices, the secure communication system for sending a plurality of messages to the computing device of a user of the plurality of users, the computing device being one of the plurality of computing devices, the plurality of messages from at least two other users of the plurality of users, each of the plurality of messages having a time indicator and a session indicator, the secure communication system receiving from the computing device of the user a response to a message of the plurality of messages and for automatically sending to the computing device a command in response to receiving the response, the response including at least one of a response message from the computing device and a selection of a clear function from the user, the command to remove the message and a portion of the plurality of messages, the portion of the plurality of messages including all messages having an earlier time indicator than the time indicator for the message, having the session indicator and being from the at least two other computing devices; and a memory for temporarily storing the at least one message.

16. The electronic communication system of claim 15 wherein the server removes each of the plurality of messages from the memory in response to receiving an acknowledgment indicating that the each of the plurality of messages has been received.

17. The electronic communication system of claim 15 wherein the plurality of users, the plurality of messages and the response are associated with a secure communication session.

* * * * *